(12) United States Patent
Weida et al.

(10) Patent No.: US 10,078,014 B2
(45) Date of Patent: Sep. 18, 2018

(54) SYSTEM AND METHOD FOR RAPID THERMAL DATA ACQUISITION

(71) Applicant: Daylight Solutions, Inc., San Diego, CA (US)

(72) Inventors: Miles James Weida, Poway, CA (US); Justin Kane, San Diego, CA (US); Daniel Forster, San Diego, CA (US); Jeremy Rowlette, Escondido, CA (US)

(73) Assignee: DAYLIGHT SOLUTIONS, INC., San Diego, CA (US)

(*) Notice: Subject to any disclaimer, the term of this patent is extended or adjusted under 35 U.S.C. 154(b) by 98 days.

(21) Appl. No.: 14/967,081

(22) Filed: Dec. 11, 2015

(65) Prior Publication Data

US 2016/0169747 A1     Jun. 16, 2016

Related U.S. Application Data

(60) Provisional application No. 62/091,025, filed on Dec. 12, 2014.

(51) Int. Cl.
| | |
|---|---|
| *H01L 25/00* | (2006.01) |
| *G01J 5/08* | (2006.01) |
| *G01J 5/02* | (2006.01) |
| *G01J 5/20* | (2006.01) |
| *G01J 5/00* | (2006.01) |
| *G01J 3/18* | (2006.01) |

(52) U.S. Cl.
CPC ............. *G01J 5/0896* (2013.01); *G01J 5/026* (2013.01); *G01J 5/084* (2013.01); *G01J 3/18* (2013.01); *G01J 2005/0077* (2013.01); *G01J 2005/202* (2013.01)

(58) Field of Classification Search
CPC ....... H04N 5/33; H01L 27/14649; G01J 5/20; G01J 2005/0077; G01J 5/08
See application file for complete search history.

(56) References Cited

U.S. PATENT DOCUMENTS 8,780,347 B2     7/2014  Kotidis et al.
9,716,843 B2 *   7/2017  Fox .......................... H04N 5/33
(Continued)

FOREIGN PATENT DOCUMENTS

| WO | WO2013063316 A1 | 5/2013 |
| WO | WO2014209471 A2 | 12/2014 |
| WO | WO2014209471 A3 | 12/2014 |

*Primary Examiner* — David Porta
*Assistant Examiner* — Mamadou Faye
(74) *Attorney, Agent, or Firm* — Roeder & Broder LLP; Steven G. Roeder (57) ABSTRACT

An assembly (12) for rapid thermal data acquisition of a sample (10) includes a laser source (14), a light sensing device (26), and a control system (28). The laser source (14) emits a laser beam (16) that is directed at the sample (10), the laser beam (16) including a plurality of pulses (233). The light sensing device (26) senses mid-infrared light from the sample (10), the light sensing device (26) including a pixel array (348). The control system (28) controls the light sensing device (26) to capture a plurality of sequential readouts (402) from the pixel array (348) with a substantially steady periodic readout acquisition rate 405. The control system (28) can generate a spectral cube (13) using information from the readouts (402).

20 Claims, 5 Drawing Sheets

(56) References Cited

U.S. PATENT DOCUMENTS

2004/0004194 A1* 1/2004 Amblard ............ G01N 21/6458
250/458.1
2009/0213882 A1* 8/2009 Weida ................ G01N 21/3504
372/23
2014/0253714 A1* 9/2014 Weida ................ G02B 21/0056
348/80

* cited by examiner

SYSTEM AND METHOD FOR RAPID THERMAL DATA ACQUISITION

RELATED INVENTION

This application claims priority on U.S. Provisional Application No. 62/091,025, filed on Dec. 12, 2014, and entitled "SYSTEM AND METHOD FOR RAPID THERMAL DATA ACQUISITION". As far as permitted, the contents of U.S. Provisional Application No. 62/091,025 are incorporated herein by reference. Further, as far as permitted, the contents of PCT Application Serial No. PCT/US12/61987, entitled "INFRARED IMAGING MICROSCOPE USING TUNABLE LASER RADIATION", filed on Oct. 25, 2012 are incorporated herein by reference. Further, as far as permitted, the contents of PCT Application Serial No. PCT/US14/33878, entitled "INFRARED REFRACTIVE OBJECTIVE LENS ASSEMBLY", filed on Apr. 11, 2014 are incorporated herein by reference.

GOVERNMENT SPONSORED DEVELOPMENT

The U.S. Government has rights in this invention pursuant to contract number NSF Phase IIB grant, Contract No. 1230424 with the National Science Foundation.

BACKGROUND

Tunable infrared lasers can provide a light source for taking images at different wavelengths. These wavelength-dependent images, known as a spectral cube, can be analyzed to determine chemical properties of a material. In order to capture the images, it is necessary to use a camera that is sensitive to the infrared. For cost, ease of use, and high linear dynamic range considerations, it is often desirable to use a microbolometer focal plane array (FPA) as the camera.

Microbolometers are thermal sensors, meaning that they detect a change in temperature. A photon is detected through the heat it generates when it is absorbed by the microbolometer. This is as opposed to a photodetector, which converts impinging photons into electrons for counting. As described herein, this leads to constraints on the way a thermal imager can be operated in order to acquire accurate data to build a spectral cube.

In order to build a practical spectral imager, it is desired to acquire the spectral cube as quickly as possible.

SUMMARY

An assembly for rapid thermal data acquisition of a sample includes a laser source, a light sensing device, and a control system. The laser source emits a laser beam that is directed at the sample, the laser beam including a plurality of pulses, with at least some of the pulses having a different center wavelength in the mid-infrared range. The light sensing device senses mid-infrared light from the sample, the light sensing device including a pixel array. The control system controls the light sensing device to capture a plurality of sequential readouts from the pixel array with a substantially steady state readout acquisition rate. The control system can generate a spectral cube using information from the readouts.

As provided herein, the light sensing device captures the plurality of sequential readouts with a substantially steady periodic readout acquisition in order to ensure highest data rate and lowest frame-to-frame variability caused byself-cooling on a pixel during read out as well as the natural variability in thermal time constant between pixels of the array.

In one embodiment, the plurality of pulses include a plurality of alternative wavelengths of interest. Further, the control system can generate a different wavelength time stamp whenever the laser source emits a different wavelength of interest, and can generate a readout time stamp for each readout of the pixel array. Further, the control system can construct a spectral cube using information from the readouts.

As alternative, non-exclusive examples, the plurality of sequential readouts can include at least 1, 50, 100, 125, 250, 500, 1000, 2000, 4000, 5000, or 10,000 sequential readouts from the pixel array with a substantially steady state readout acquisition rate.

In certain embodiments, the substantially steady periodic readout acquisition rate is within 0.4 percent of a target readout acquisition rate. For example, the target readout acquisition rate can be similar to and based on a thermal time constant of the light sensing device. In one design, the substantially steady periodic readout acquisition rate can be within 0.4 percent of thirty Hertz.

In one embodiment, the laser source includes (i) a gain medium adapted to generate a beam that exits the gain medium; (ii) a feedback device positioned in the path of the beam, the feedback device redirecting at least a portion of the beam back to the gain medium; (iii) a device mover that continuously adjusts an angle of incidence of the beam on the feedback device; and (iv) a position detector that generates a position signal that relates to the angle of incidence of the beam on the feedback device. Further, the pixel array can be a two dimensional, microbolometer array of pixels that is sensitive to mid-infrared light.

In another embodiment, the present invention is directed to a method for rapidly acquiring data regarding a sample. The method can include (i) directing a laser beam at the sample with a laser source, the laser beam including a plurality of pulses, with at least some of the pulses having a different center wavelength in the mid-infrared range; (ii) sensing mid-infrared light from the sample with a light sensing device that includes a pixel array; and (iii) controlling the light sensing device to capture a plurality of sequential readouts from the pixel array with a substantially steady state readout acquisition rate with a control system that includes a processor.

In yet another embodiment, the present invention is directed to a mid-infrared microscope for generating a spectral cube of a sample. The mid-infrared microscope can include (i) a laser source that emits a laser beam that is directed at the sample, the laser beam including a plurality of pulses, with at least some of the pulses having a different wavelength of interest; (ii) a light sensing device that senses mid-infrared light from the sample, the light sensing device including a two dimensional pixel array; and (iii) a control system that includes a processor, the control system controlling the light sensing device to capture a plurality of sequential readouts from the pixel array with a substantially steady periodic readout acquisition rate; the control system generating a different wavelength time stamp whenever the laser source emits a different wavelength of interest, and generating a readout time stamp for each readout of the pixel array; wherein the control system constructs a plurality of thermal images from that readouts and a spectral cube using the thermal images.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
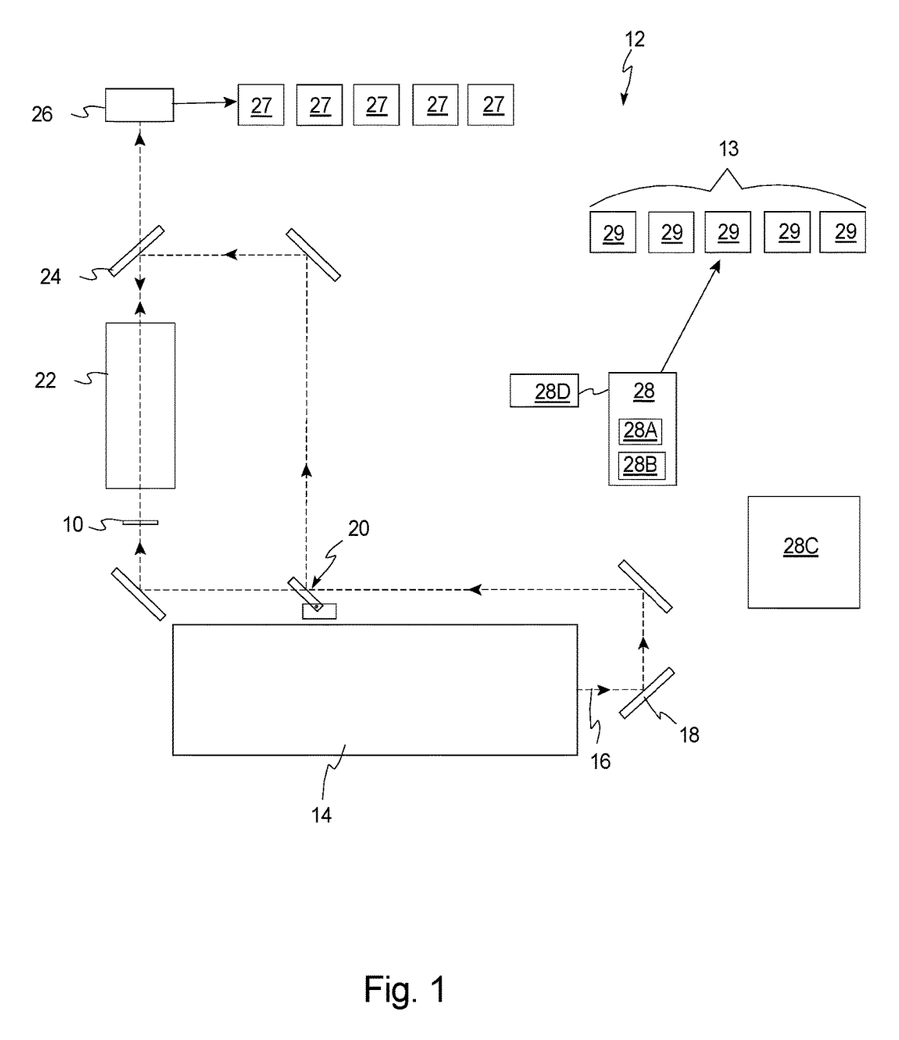
FIG. 1 is a simplified illustration of an imaging microscope having one or more features of the present invention.

FIG. 1 is simplified schematic illustration of a sample 10 and an imaging microscope 12 ("assembly") having features of the present invention. In particular, the imaging microscope 12 can be used to quickly and accurately acquire a spectral cube 13 of the sample 10 that can be used to analyze and evaluate the various properties of the sample 10. For example, in one embodiment, the imaging microscope 12 is a mid-infrared imaging microscope that uses tunable laser radiation to spectroscopically interrogate the sample 10 in order to quickly acquire the spectral cube 13.

As an overview, in certain embodiments, the imaging microscope 12 is controlled to quickly spectrally analyze the sample 10 using a predetermined, set of discrete wavelengths in the mid-infrared range to acquire the spectral cube 13 for the sample 10. More specifically, in certain embodiments, the present invention uses a thermal imager and a scanning laser source that are controlled to decrease the acquisition time for the spectral cube 13.

The sample 10 can be a variety of things, including mammalian blood, mammalian blood serum, mammalian cells, mammalian tissue, mammalian biofluids, and their animal counterparts, plant matter, explosive residues, powders, liquids, solids, inks, and other materials commonly analyzed using spectroscopy and microscopy. More particularly, in certain non-exclusive applications, the sample 10 can be human blood serum, and the imaging microscope 12 can be utilized for rapid screening of the serum sample 10 for the presence of disease and/or other health related conditions; and/or the imaging microscope 12 can be utilized in certain forensic applications such as rapid screening of the sample 10 for the presence of explosive residues and/or other dangerous substances.

Further, the sample 10 can be thin enough to allow study through transmission of an illumination beam, e.g., an infrared illumination beam, through the sample 10 (i.e. in transmission mode), or the sample 10 can be an optically opaque sample that is analyzed through reflection of an illumination beam, e.g., an infrared illumination beam, by the sample (i.e. in reflection mode). Further, the sample 10 can be thin enough to allow study through transflection of an illumination beam, e.g., an infrared illumination beam can pass through the sample, reflect on the surface of a reflective substrate, and again pass through the sample, the illumination beam being double attenuated. For example, in the embodiment illustrated in FIG. 1, the imaging microscope 12 can alternatively be utilized in both transmission mode and reflection mode, and data acquired using a transmission, reflection, or transflection methodology.

The design of the imaging microscope 12 can be varied. A detailed discussion of a suitable imaging microscopes are described in PCT Application Serial Nos. PCT/US12/61987 and PCT/US14/33878. In one embodiment, the imaging microscope 12 is an infrared imaging microscope that uses tunable laser radiation to interrogate one or more objects (samples) 10 in order to reveal properties of the sample 10 that are less apparent under ordinary illumination.

In certain embodiments, the imaging microscope 12 has a relatively high resolution, high numerical aperture ("NA"), and a relatively large field of view ("FOV"). This allows for the collection of data from relatively large samples. This will improve the speed in which the sample is analyzed.

As a non-exclusive example, the imaging microscope 12 can have NA of 0.7, a magnification of 12.5×, and a FOV of 650 µm×650 µm, with a sample-referred pixel size of 1.36 µm.

In the embodiment illustrated in FIG. 1, the imaging microscope 12 includes (i) a laser source 14 that generates a laser beam 16, (ii) a plurality of spaced apart beam steerers 18 that steer the beam 16, (iii) an illumination switch 20 that is controlled to either direct the beam 16 at the sample 10 in transmission mode or reflection mode, (iv) an objective lens assembly 22, (v) a beamsplitter 24, and (vii) a light sensing device 26 that captures a set of readouts 27 (only five are illustrated in FIG. 1) that are used to create a set of images 29 that make up the spectral cube 13 of the sample 10. Each readout 27 can also be referred to as a frame.

The number of discrete readouts 27 in the set used to generate the spectral cube 13 can vary according to the sample 10. As a non-exclusive examples, the number of discrete readouts 27 in the set utilized to generate the spectral cube can be approximately 1, 10, 25, 50, 100, 125, 250, 500, 1000, 2000, 4000, 5000, or 10,000. Further, one or more readouts 27 can be used for each image 29. As a non-exclusive example, two or more readouts 27 can be averaged to generate each image 29.

The number of discrete images 29 in the set used to generate the spectral cube 13 can vary according to the sample 10. As a non-exclusive examples, the number of discrete images 29 in the set utilized to generate the spectral cube can be approximately 1, 10, 25, 50, 100, 125, 250, 500, 1000, or 2000.

It should be noted that the imaging microscope 12 can be designed with more or fewer components than are illustrated in FIG. 1, and/or the components can be organized in another fashion than illustrated in FIG. 1. For example, the microscope 12 can include a multiple position lens turret (not shown) that includes one or more mid-infrared objective lens assemblies with different characteristics, and/or one or more objective lens assemblies that work outside the mid-infrared spectral range.

Additionally, the imaging microscope 12 can further include a control system 28 that controls one or more components of the imaging microscope 12. More specifically, the control system 28 can control the operation of the laser source 14, control the operation of the light sensing device 26, and/or receive the readouts 27 ("information") from the pixels of the light sensing device 26, generate the images 29 and the spectral cube 13 of the sample 10. For example, the control system 28 can include one or more processors 28A (only one is illustrated in FIG. 1), and one or more electronic data storage devices 28B (only one is illustrated in FIG. 1). Moreover, the control system 28 can be a distributed control system where control elements (each including one or more processors and/or electronic data storage devices) are distributed throughout the imaging microscope 12.

Further, one or more of the functions provided herein can be performed by an external control system 28C, such as an external computer.

Additionally, the control system 28 can include a hardware clock 28D that is controlled to generate a readout time stamp for each readout 27 of the light sensing device 26. For example, the readout time stamp can be generated at the start, during or at the finish of each readout 27.

Moreover, the control system 28 can control the tunable laser source 14 to generate a separate indication signal upon arrival of the laser pulse at each specified wavelength of interest. Further, the hardware clock 28D can create a wavelength time-stamp for each indication signal. With this design, the control system 28 can match up each acquired readout 27 with the associated laser wavelength arrival time stamp to generate the images 29 and construct the spectral cube 13.

Figure 2:
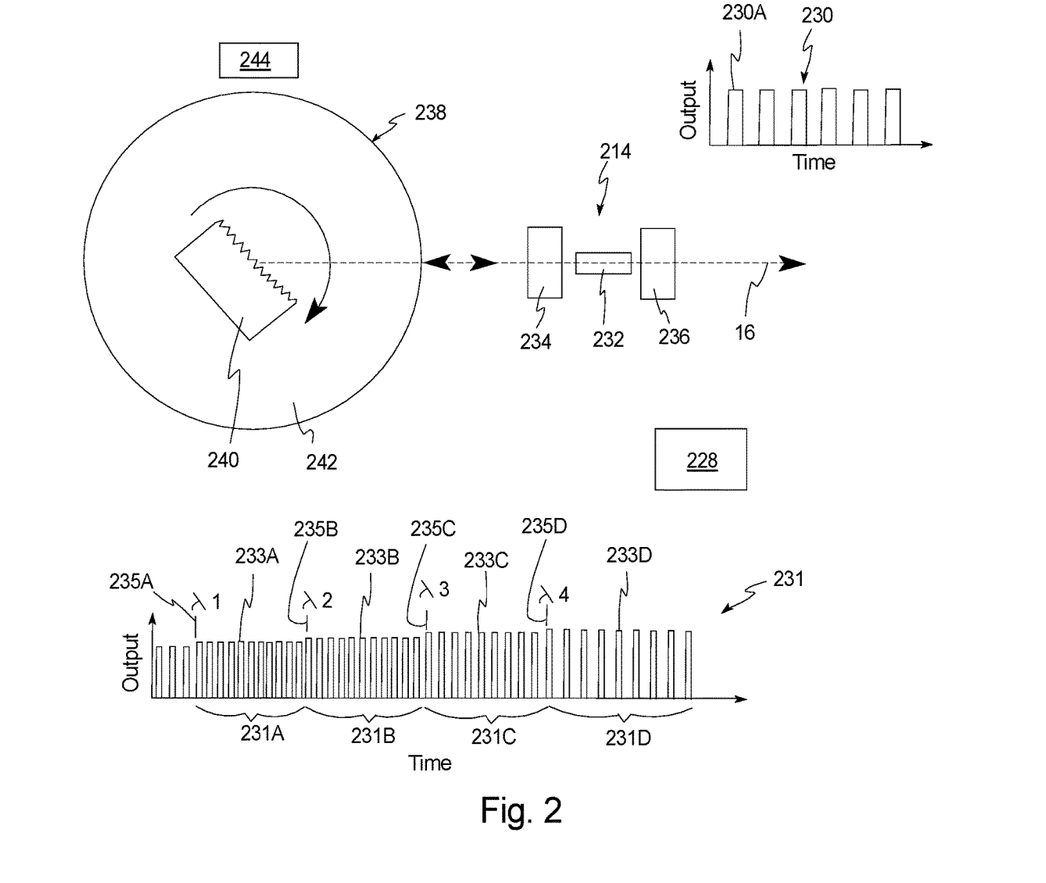
FIG. 2 is a simplified illustration of a laser source and output from the laser source.

FIG. 2 illustrates a non-exclusive example of a suitable laser 214 that can be used in the laser source 14 of the imaging microscope 12 of FIG. 1. In one embodiment, the laser 214 emits a temporally coherent, laser beam 16 that is usable for illuminating and analyzing the sample 10 (illustrated in FIG. 1) in transmission mode and/or in reflection mode.

Lasers 214 that generate light 16 in the mid infrared range ("MIR range") are particularly useful to spectroscopically interrogate the sample 10 since many samples 10 have their fundamental vibrational modes in the MIR range, and thus present strong, unique absorption signatures within the MIR range. In order to analyze a wide range of samples 10, the laser 214 should generate a beam 16 that consists of a set of sequential, sets of specific output pulses of light having different center wavelengths that span the entire or just a portion of the mid-infrared range of approximately 2-20 micrometers. FIG. 2 includes a graph 230 that illustrates a plurality of output pulses 230A versus time generated by the laser 214. It should be noted that each output pulse 230A can have a different center wavelength in the MIR range. One or more of these wavelengths can be considered a "wavelength of interest" because that wavelength has good absorption for certain samples 10 or readily transmits through certain samples 10. Thus, the various wavelengths of interest can be selected according to the sample 10 being analyzed.

The number of discrete wavelengths on interest in the set used to acquire the images 29 (illustrated in FIG. 1) for the spectral cube 13 (illustrated in FIG. 1) can also vary according to the sample 10. As a non-exclusive examples, the number of discrete wavelengths in the mid-infrared range utilized to acquire the spectral cube 13 can be approximately 1, 10, 25, 100, 125, 250, 500, 1000, or 2000.

FIG. 2 also includes a graph 231 that illustrates an alternative, plurality of output pulses versus time that can be generated by the laser 214. In this embodiment, a laser control system 228 (part of the control system 28 illustrated in FIG. 1) can control the laser 214 to generate (i) a first set 231A of a plurality of sequential first pulses 233A, with each first pulse 233A in the first set 231A having approximately the same first center wavelength ($\lambda 1$); (ii) a second set 231B of a plurality of sequential second pulses 233B, with each second pulse 233B having approximately the same second center wavelength ($\lambda 2$); (iii) a third set 231C of a plurality of sequential third pulses 233C, with each third pulse 233C having approximately the same third center wavelength ($\lambda 3$); and (iv) a fourth set 231D of a plurality of sequential fourth pulses 233D, with each fourth pulse 233D having approximately the same fourth center wavelength ($\lambda 4$). Only four alternative sets 231A-231D of sequential pulses 233A-233D are illustrated in FIG. 2. However, it should be noted that in certain non-exclusive embodiments, the laser 214 is controlled to generate approximately 1, 10, 25, 50, 100, 125, 250, 500, 1000, 2000, 5000, or 10000 alternative sets 231A-231D of sequential pluses 233A-233D.

In certain embodiments, each set 231A-231D has a different center wavelength (illustrated by different heights). More specifically, (i) the first center wavelength ($\lambda 1$) is different from the second center wavelength ($\lambda 2$), the third center wavelength ($\lambda 3$), and the fourth center wavelength ($\lambda 4$); (ii) the second center wavelength ($\lambda 2$) is different from the first center wavelength ($\lambda 1$), the third center wavelength ($\lambda 3$), and the fourth center wavelength ($\lambda 4$); (iii) the third center wavelength ($\lambda 3$) is different from the first center wavelength ($\lambda 1$), the second center wavelength ($\lambda 2$), and the fourth center wavelength ($\lambda 4$); and (iv) the fourth center wavelength ($\lambda 4$) is different from the first center wavelength ($\lambda 1$), the second center wavelength ($\lambda 2$), and the third center wavelength ($\lambda 3$). Further, each center wavelength can be in the mid-infrared range, and can be a wavelength of interest.

It should also be noted that, in certain embodiments, the laser 214 can be controlled to output pulses in between the sets 231A-231D, but at a different rate (e.g. a less frequent rate). The intermediate pulses may be at wavelengths (between wavelengths of interest) that are not particularly significant for the analysis of a particular sample 10.

In FIG. 2, (i) a line 235A represents a first wavelength time stamp which designates and identifies the time when the laser 214 has been controlled by the laser control system 228 to generate the first set 231A of pulses; (ii) a line 235B represents a second wavelength time stamp which designates and identifies the time when the laser 214 has been controlled by the laser control system 228 to generate the second set 231B of pulses; (iii) a line 235C represents a third wavelength time stamp which designates and identifies when the laser 214 has been controlled by the laser control system 228 to generate the third set 231C of pulses; and (iv) a line 235D represents a fourth wavelength time stamp which designates and identifies when the laser 214 has been controlled by the laser control system 228 to generate the fourth set 231D of pulses.

In FIG. 2, each wavelength time stamp 235A-235D represents the moment in time when the laser beam 16 has reached a wavelength of interest at the beginning of the set 231A-231D of sequential pulses. However, it should be noted that each wavelength time stamp 235A-235D can be at a different location in time, e.g. at the middle or end of each respective set 231A-231D of sequential pulses.

In certain embodiments, the laser control system 228 generates a time stamp ("indication") signal when the laser beam 16 has reached a wavelength of interest at the beginning of the set 231A-231D of sequential pulses. This indication signal can be used by the clock 28D (illustrated in FIG. 1) to generate the respective wavelength time stamp 235A-235D. It should be noted that each indication signal can be generated at a different time, e.g. at the middle or end of each respective set 231A-231D of sequential pulses.

It should also be noted that the number of pulses and repetition rate of the pulses for each set 231A-231D (at each respective wavelength of interest) can be varied to achieve the desired intensity of the laser beam 16 on the sample 10. Stated in another fashion, at each wavelength of interest (for each set 231A-231D), the number of pulses per unit time can be varied to achieve the desired illumination of the sample 10. Stated in yet another fashion, for each set 231A-231D, the repetition rate and number of pulses generated by the laser 214 can be controlled by the laser control system 228 to achieve the desired intensity on the sample 10 for each wavelength of interest. This feature allows for the control of power directed at the sample 10 at each wavelength of interest, while keeping the driving voltage and current from the laser control system 228 directed to the laser 214 substantially constant. Thus, in certain embodiments, the optical power directed at the sample 10 for each set 231A-231D can be selectively and individually adjusted by the laser control system 228 by changing the pulse repetition rate in which the laser control system 228 directs current to a gain medium 232 of the laser 214, instead of by changing the drive current of the laser 214.

In the non-exclusive example illustrated in FIG. 2, each set 231A-231D has a different repetition rate. Thus, in this example, for each wavelength, the number of pulses and the repetition rate can be varied. However, in another embodiment, each set 231A-231D can have a similar repetition rate and/or a similar number of pulses.

In FIG. 2, only a few pulses are illustrated for each set 231A-231D for clarity. However, as non-exclusive examples, the number of pulses in each set 231A-231D can be include approximately 1, 2, 5, 10, 30, 50, 75, 100, 200, 300, 500, 1000, 2000, 10000, 15000, 20000, or 30000 separate pulses.

As a non-exclusive example, the laser 214 can be controlled by the laser control system 228 to pulse at a repetition rate anywhere between approximately 1 Hz and 500 KHz in between the sets. This rate can be changed as the laser 214 arrives at each wavelength of interest (e.g. stamped or tagged) to have a repetition rate between 1 Hz and 500 KHz range. Stated in another fashion, in one embodiment, during each set 231A-231D, the repetition rate can be somewhere between 1 Hz and 500 KHz range.

Further, the duration of each pulse of power directed by the laser control system 228 to the gain medium 232 can also be varied for each set 231A-231D. In alternative, non-exclusive embodiments, the laser control system 228 can control each pulse of power to have a duration of approximately 1, 10, 25, 50, 75, 100, 150, 200, 300, 400, 500, 600 or 1000 nanoseconds.

In one embodiment, the laser 214 is a mid-infrared (MIR) laser that generates the illumination beam 16 in the mid infrared ("MIR") range spectrum between approximately two to twenty microns (2-20 μm). The laser 214 can be a pulsed laser. Alternatively, the laser 214 can be designed to generate one or more output pulses of light having a center wavelength of greater than or lesser than 2-20 micrometers.

Additionally, the laser source 14 of FIG. 1 can include multiple individual lasers 214 that span a portion or all of the desired mid-infrared spectral range. A description of a laser source 14 that includes multiple individual lasers is described in U.S. patent application Ser. No. 13/949,159, entitled "Laser Source With A Large Spectral Range" filed on Jul. 23, 2013. As far as permitted, the contents of U.S. patent application Ser. No. 13/949,159 are incorporated herein by reference. The laser source 14 can utilize a variety of methods to rapidly switch between the interrogation wavelengths. These include techniques such as rapid tuning mechanisms, galvo-controllled mirrors to switch between different laser modules, or spectral beam combining techniques of multiple laser modules and subsequent time-division multiplexing of laser illumination.

In FIG. 2, the laser 214 is an external cavity laser that includes the gain medium 232, a cavity optical assembly 234, an output optical assembly 236, and a wavelength selective ("WS") feedback assembly 238 (e.g. a movable grating). In one, non-exclusive embodiment, the gain medium 232 directly emits the beam 16 without any frequency conversion. As a non-exclusive example, the gain medium 232 can be a semiconductor type laser. As used herein, the term semiconductor shall include any solid crystalline substance having electrical conductivity greater than insulators but less than good conductors.

In one embodiment, the gain medium 232 is a Quantum Cascade (QC) gain medium, an Interband Cascade (IC) gain medium, or a mid-infrared diode. The thickness of these wells/barriers of the gain medium 232 determines the wavelength characteristic of the gain medium 232. Fabricating QC gain medium 232 of different thickness enables production of the laser 214 having different output frequencies within the MIR range.

Alternatively, another type of gain medium 232 can be utilized.

In FIG. 2, the gain medium 232 includes (i) a first facet that faces the cavity optical assembly 234 and the WS feedback assembly 238, and (ii) a second facet that faces the output optical assembly 236. In this embodiment, the gain medium 232 emits from both facets. In one embodiment, the first facet is coated with an anti-reflection ("AR") coating and the second facet is coated with a reflective coating. The AR coating allows light directed from the gain medium 232 at the first facet to easily exit the gain medium 232 as a light beam directed at the WS feedback assembly 238; and allows the light beam reflected from the WS feedback assembly 238 to easily enter the gain medium 232.

The output beam 16 exits from the second facet. The reflective coating on the second facet reflects at least some of the light that is directed at the second facet from the gain medium 232 back into the gain medium 232. In one non-exclusive embodiment, the AR coating can have a reflectivity of less than approximately 2 percent, and the reflective coating can have a reflectivity of between approximately 2-95 percent. In this embodiment, the reflective coating acts as an output coupler (e.g. a first end) for the external cavity.

The cavity optical assembly 234 is positioned between the gain medium 232 and the WS feedback assembly 238 along a lasing axis, and collimates and focuses the light that passes between these components. For example, the cavity optical assembly 234 can include one or more lens. For example, the lens can be an aspherical lens having an optical axis that is aligned with the lasing axis. In one embodiment, to achieve the desired small size and portability, the lens has a relatively small diameter. The lens can comprise materials selected from the group of Ge, ZnSe, ZnS, Si, CaF2 (calcium fluoride), BaF2 (barium fluoride), or chalcogenide glass. However, other materials may also be utilized.

It should be noted that fine tuning of the output beam 16 can be achieved by controlling the temperature of the gain medium 232, such as by changing the DC bias current. Such temperature tuning is relatively narrow and may be used to vary the wavelength by approximately 1-2 gigahertz/Kelvin which is typically less than 0.01% of the peak emission wavelength.

The output optical assembly 236 is positioned along the lasing axis. In this design, and the output optical assembly 236 collimates and focuses the output beam 16 that exits the second facet of the gain medium 232. For example, the output optical assembly 236 can include one or more lens that are somewhat similar in design to the lens of the cavity optical assembly 234.

The WS feedback assembly 238 reflects the light back to the gain medium 232, and is used to precisely select and adjust the lasing frequency of the external cavity and the wavelength of the output beam 16. Stated in another fashion, the WS feedback assembly 238 is used to feed back to the gain medium 232 a relatively narrow band wavelength which is then amplified in the gain medium 232. In this manner, the output beam 16 may be tuned with the WS feedback assembly 238 without adjusting the gain medium 232. Thus, with the external cavity arrangements disclosed herein, the WS feedback assembly 238 dictates what wavelength will experience the most gain and thus dominate the wavelength of the output beam 16.

A number of alternative embodiments of the WS feedback assembly 238 can be utilized. In FIG. 2, the WS feedback assembly 238 is spaced apart from the gain medium 232 and defines a second end of the external cavity. In this embodiment, the external cavity extends from the output coupler (reflective coating) on the second facet to the WS feedback assembly 238. The term external cavity is utilized to designate the WS feedback assembly 238 is positioned outside of the gain medium 232.

In FIG. 2, the WS feedback assembly 26 includes a selector element 240, a selector mover 242, and a measurement system 244 that cooperate to rapidly adjust the lasing frequency of the external cavity and the center wavelength of each of pulse of the output beam 16.

In one embodiment, the selector element 240 is a diffraction grating that has wavelength dependent reflectivity, and rotation of the diffraction grating relative to the lasing axis and the gain medium 232 with the selector mover 242 adjusts the lasing wavelength and the wavelength of the pulses of the output beam 16. A typical diffraction grating 240 includes a glass or polished metal reflector surface having a large number of very fine parallel grooves or slits. With this design, rotation of the grating 240 relative to the gain medium 232 serves to preferentially select a single wavelength which is the first order diffracted light from the grating 240. Thus, the grating 240 is used to precisely adjust the lasing frequency of the external cavity and the wavelength of the output beam 16. Stated in another fashion, the grating 240 is used to feed back to the gain medium 232 a relatively narrow band wavelength which is then amplified in the gain medium 232.

In alternative, non-exclusive embodiments, the selector element 240 can be moved to control the fixed center wavelength of each output pulse to within approximately 0.1, 0.01, 0.001, or 0.0001 micrometers. In certain embodiments, with the designs provided herein, each of output pulse has a relatively narrow line width. In non-exclusive examples, the laser 214 can be designed so that the line width of the pulses is less than approximately 5, 4, 3, 2, 1, 0.8, 0.5, or 0.1 cm-1. Alternatively, the laser 214 can be designed so that the line width of the pulses is greater than approximately 7, 8, 9, or 10 cm-1. The spectral width of the pulses can be adjusted by adjusting the cavity parameters of the external cavity 36. For example, the spectral width of the pulses can be increased by increasing the focal length of the cavity optical assembly 234.

Alternatively, for example, the selector element 240 can include a MEMS grating.

In one embodiment, the laser control system 228 controls the selector mover 242 to quickly adjust the angle of incidence θ of the beam on the selector element 240 to quickly generate the set of output beams. In FIG. 2, the selector mover 242 includes a rotary motor that rotates the selector element 240. Alternatively, for example, the selector mover 242 can be a voice coil motor that pivots the selector element 240. Still alternatively, the selector mover 242 can be another type of actuator that fits these design requirements.

In the design illustrated in FIG. 2, the tuning of the wavelength of the pulses is realized by changing the angle of incidence θ of the light on the grating 240 to change the lasing wavelength. With this design, the selector mover 242 can move the selector element 240 to a plurality of alternative device positions (a plurality of alternative angle of incidences θ) to generate the sets 231A-231D. For example, the laser control system 228 controls the selector mover 242 to move the selector element 240 to (i) a first element position to generate the first set 231A of pulses at the first wavelength; (ii) a second element position to generate the second set 231B of pulses at the second wavelength; (iii) a third element position to generate the third set 231C of pulses at the third wavelength; and (iv) a fourth element position to generate the fourth set 231D of pulses at the fourth wavelength.

In certain designs, in order to realize the full tuning range of the laser 214, the selector element 240 must be rotated over an adjustment range that is approximately five degrees. Thus, in this embodiment, the selector mover 242 adjusts the angle of incidence θ and the angle of the selector element 240 approximately five degrees to generate the desired sets 231A-231D of pulses.

The measurement system 244 accurately measures and monitors the position of at least a portion of the WS feedback assembly 238 and provides a position signal to the laser control system 228 that relates to the position of at least a portion of the WS feedback assembly 238. Stated in another fashion, the measurement system 244 can generate a position signal that relates to each element position of the selector element 240. For example, the measurement system 244 can generate a first position signal when the selector element 240 is at the first element position, a second position signal when the selector element 240 is at the second element position, a third position signal when the selector element 240 is at the third element position, and a fourth position signal when the selector element 240 is at the fourth element position. Further, the position signals relate to the angle of incidence θ of the beam on the selector element 240.

In this example, the laser control system 228 can generate (i) a first indication signal when the selector element 240 is at the first element position so that the clock 28D can record the first wavelength time stamp; (ii) a second indication signal when the selector element 240 is at the second element position so that the clock 28D can record the second wavelength time stamp; (iii) a third indication signal when the selector element 240 is at the third element position so that the clock 28D can record the third wavelength time stamp; and (iv) a fourth indication signal when the selector element 240 is at the fourth element position so that the clock 28D can record the fourth wavelength time stamp.

In one non-exclusive example, the measurement system 244 is an optical encoder that includes a plurality of encoder marks, and an optical reader. With this design, the optical reader can monitor the encoder marks and provide a position signal that relates to the element position of the selector element 240. Alternatively, for example, the measurement system 244 can include a Hall type sensor, or another type of sensor.

The laser control system 228 controls the operation of the laser 14 including the electrical power to the selector mover 242, and the electrical power that is directed to the gain medium 232 (e.g. controls the gain medium 232 by controlling the electron injection current).

The collection of accurate spectral cube requires that the wavelength of the pulse be precisely known as the laser 214 is tuned. In certain embodiments, the laser control system 228 directs the pulses of power to the gain medium 232 based on the position signal received from the measurement system 244. In this example, the laser control system 228 can direct a pulse of power to the gain medium 232 every time the optical reader reads a predetermined number of encoder marks. For example, the predetermined number can be one, two, or three encoder marks.

Stated in another fashion, the laser control system 228 can direct a pulse of power to the gain medium 232 at each of the plurality of alternative device positions so that the laser 214 generates the set of pulses. In this embodiment, the laser control system 228 can direct one or more pulses of power to the gain medium 232 upon receipt of each new position signal. As a result thereof, the specific wavelength of the pulses will not be influenced by variations in speed of the selector mover 242.

In one embodiment, the pulsing of the power to the gain medium 232 allows the laser pulses to be tied directly to the angular rotation by employing a phase-locked-loop (PLL) technique where the position signals from the measurement system 244 are up-converted in frequency and phase locked to the angular signals to allow the pulses of power to be fired at precise angular increments that are well characterized. These angles for each power pulse can then be converted to an accurate wavelength scale for the recorded chemical spectra.

Accuracy and sensitivity are also enabled by using boxcar integration techniques with the position signals to allow the high-frequency pulsing of the laser to be analyzed in real time. This is necessary to use the full spectral range of the laser even as it is rapidly tuning.

In one non-exclusive embodiment, the laser control system 228 can control the selector mover 242 and the gain medium 232 to generate a set of sequential, specific, different wavelength output pulses that span a portion or the entire the MIR range. In one non-exclusive example, the mover 242 and the gain medium 232 can be controlled by the laser control system 228 to sequentially generate approximately one thousand different wavelength output pulses that cover a detection range of approximately four to six micrometers (4 to 6 micrometers). In another non-exclusive example, the mover 242 and the gain medium 232 can be controlled by the laser control system 228 to sequentially generate more than one thousand or fewer than one thousand different wavelength output pulses and the detection range can be greater or less than six micrometers. For example, in yet another non-exclusive example, the mover 242 and the gain medium 232 can be controlled by the laser control system 228 to sequentially generate five hundred different wavelength output pulses that cover the detection range of approximately two micrometers.

In certain designs, utilization of the whole spectral range of the laser 214 is necessary to achieve specificity in the spectral cube. The greater the spectral range that can be analyzed enhances resolution between different spectral signatures for different samples, thus allowing the individual components to be detected.

Additionally, the laser 214 can be calibrated using a wavelength measurement device (not shown) during manufacturing of the laser 214. More specifically, with the laser 214 activated, the mover 242 can be used to change the angle of incidence θ, while monitoring position of the selector element 240 with the measurement system 244, and wavelength of the output pulses with the wavelength measurement device. With this design, each position signal of the measurement system 244 can be corresponded to a measured center wavelength of one of the output pulses of the set. Stated in another fashion, the laser control system 228 can determine a center wavelength of the respective pulse based on the position signal.

Referring back to FIG. 1, the design of the light sensing device 26 can be varied to correspond to the wavelength range of the laser beam 16. For example, for a MIR beam 16, the light sensing device 26 can be an infrared camera that includes an image sensor that senses infrared light and converts the infrared light into an array of electronic signals that represents an image of the sample. Stated in another fashion, if the illumination beam 16 is in the MIR range, the image sensor is designed to be a MIR imager. More specifically, if the illumination beam 16 is in the infrared spectral region from two to twenty µm, the light sensing device 26 is sensitive to the infrared spectral region from two to twenty µm.

Non-exclusive examples of suitable infrared light sensing devices 26 include (i) vanadium oxide ($VO_x$) microbolometer arrays that are commonly responsive in the seven to fourteen µm spectral range; (ii) mercury cadmium telluride (HgCdTe or MCT) arrays that are commonly responsive in the 7.7 to 11.5 µm spectral range; (iii) indium antimonide (InSb) arrays that are commonly responsive in the 1.5 to 5.5 µm spectral range; (iv) indium gallium arsenide (InGaAs) arrays; (v) uncooled hybrid arrays involving $VO_x$ and other materials from DRS that are responsive in the two to twenty µm spectral range; or (vi) any other type of image sensor that is designed to be sensitive to infrared light in the two to twenty µm range and has electronics allowing reading out of each element's signal level to generate a two-dimensional array of image information.

Figure 3A:
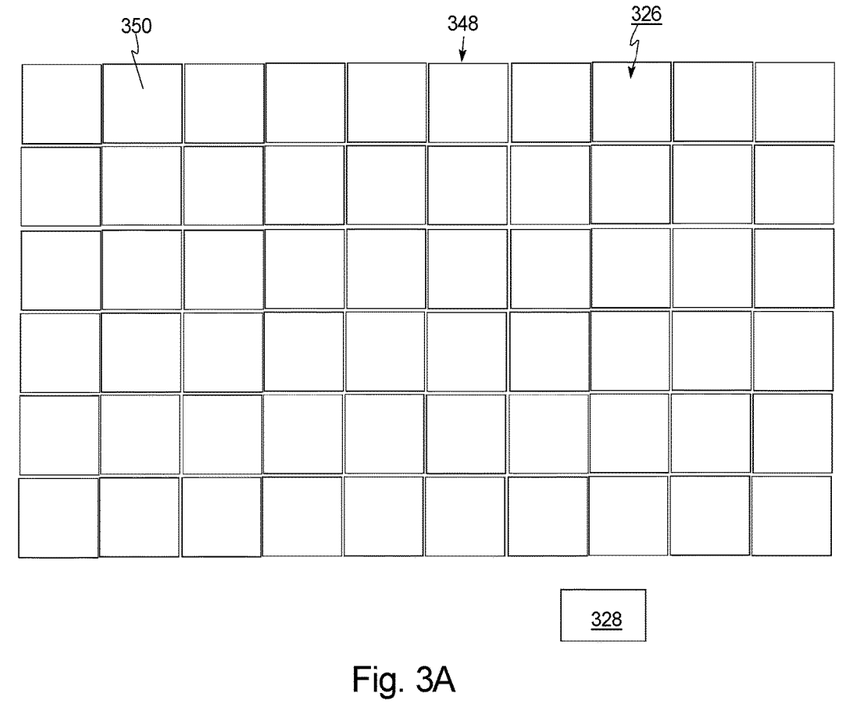
FIG. 3A is a simplified top illustration of a plurality of pixels of a light sensing device.

FIG. 3A is a simplified top view of one, nonexclusive example of a suitable light sensing device 326. In one specific embodiment, the light sensing device 326 is a microbolometer that includes a two dimensional pixel array 348 of photosensitive elements (pixels) 350 that are sensitive to the wavelength of the laser beam 16, and an imager control system 328. Stated in another fashion, in one embodiment, the light sensing device 326 is a micro-electromechanical systems (MEMS) fabricated in such a way as to create a plurality of small bolometer pixel elements 350 that are thermally isolated from the underlying substrate. The spacing between the pixel elements 350 is referred to as the pitch of the array.

The number, size and shape of the pixels 350 in the array 348 can be varied to suit the design requirements of the light sensing device 326. In the simplified example illustrated in FIG. 3A, the array 348 includes sixty pixels 350 organized in a six by ten array 348. Alternatively, the array 348 can be designed to include hundreds, thousands, or millions of individual pixels 350.

In certain embodiments, in order to generate an image using information from the light sensing device 326, it is necessary to read out the resistance on each microbolometer element 350. Reading the resistance requires applying either a voltage or current across each individual element 350. However, the process of reading out the resistance can in and of itself affect the temperature of the microbolometer element 350, and hence affect the reading. For example, passing a current through resistive material generates heat. For more complicated structures that consist of junctions between dissimilar materials, the process of applying a voltage or current can either increase or decrease the temperature through thermoelectric effects. The direction of the voltage or current flow dictates whether heating or cooling will occur.

In this embodiment, the imager control system 328 controls the capturing of the information by each element 350, and receives the information from each element 350 to create the image(s) 29. As used herein, the term "readout" or "frame" shall refer the information (e.g. resistance) collected at all of the pixels 350 at a particular time. For a two dimensional pixel array 348 the readout will include a two dimensional array of information.

Figure 3B:
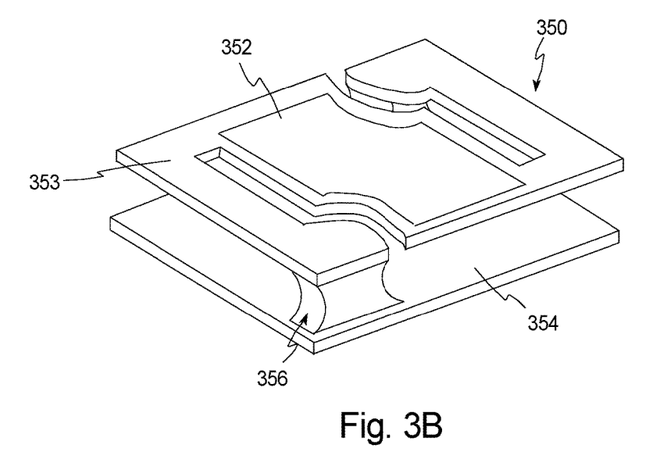
FIG. 3B is a simplified perspective illustration of one of the pixels of the light sensing device.

FIG. 3B is a simplified perspective view of a non-exclusive example of a single pixel 350 that can be used in the array 348 of the light sensing device 326 of FIG. 3A. In this embodiment, the other pixels (not shown) of the light sensing device 326 of FIG. 3A can be similar to the pixel 350 illustrated in FIG. 3B. In this non-exclusive embodiment, each pixel 350 includes an infrared-light absorbing region 352, a pair of spaced apart bridges 353, a readout cell 354, and a support assembly 356 that supports the absorbing region 352 spaced apart from the readout cell 354.

The size and shape of these components can be varied. In one, non-exclusive embodiment, each microbolometer element 350 is approximately 17 μm×17 μm in size, and have a gap of approximately 2 um between the readout cell 354 and the light absorbing region 352. The small size allows for finer resolution when used as part of a focal plane array (FPA) in a camera.

The absorbing region 352 absorbs light and is made of a temperature sensitive material. Heating the absorbing region 352 causes the resistance to drop, while cooling causes it to rise. By choosing the right materials or conditions, it is possible to create a measurably large change in resistance for a small change in temperature. In this way, bolometers can be made sensitive enough to measure the temperature increase caused by absorbing small amounts of light. As non-exclusive examples, the absorbing region 352 for infrared light detection can be made of silicon or vanadium oxide ($VO_x$). Both these materials can be made in such a way as to create a measurable change in resistance for very low changes in temperature. For example, most commercial microbolometers, have a temperature sensitivity of better than 50 mK at 30 Hz operation.

The bridges 353 support the absorbing region 352 and connect the absorbing region 352 to the support assembly 356. As a non-exclusive example, the bridges can be made of $Si_3N_4$.

The readout cell 354 is in electrical communication with the absorbing region 352 and applies either a voltage or current across the absorbing region 352 to read out the resistance on each absorbing region 352. Further, the readout cell 354 is electrically connected to the imager control system 328 (illustrated in FIG. 3A) and is controlled by the imager control system 328. For example, the imager control system 328 can control the readout rate of the pixels 350 of the light sensing device 326. Further, information (e.g. element resistance) from the readout cell 354 of each pixel 350 is transferred to the imager control system 328 for generation of the image(s) 29. In one, non-exclusive embodiment, the readout cell 354 includes a silicon substrate and a readout integrated circuit.

The support assembly 356 supports the absorbing region 352 spaced apart from the readout cell 354 so that the absorbing region 352 is thermally isolated from the readout cell 354. The thermal isolation makes it possible for these devices to operate without being strongly influenced by the underlying thermal properties and capacitance of the readout cell 354. Hence, the heat produced by absorbed photons in the absorbing region 352 still results in a measurable change in resistance through the material before this heat can flow from the absorbing region 352 and into the readout cell 354. The time constant for this heat flow in common microbolometer structures is on the order of 10 msec. This is another place where the small size adds benefits; larger sizes have slower time constants, which limit the practical use in capturing live video images.

As can be seen in FIG. 3B, the microbolometer MEMS element 350 contains several material junctions, and thermoelectric effects do occur when reading out the element resistance. In certain embodiments, the voltage and current that is applied to the absorbing region 352 by the readout cell 354 during readout can cause the temperature of the absorbing region 352 to change (e.g. decreases the temperature).

The self cooling during readout has important consequences for how the light sensing device 326 can be operated in order to achieve maximum sensitivity and speed. The present invention discloses a unique method for synchronizing the pulses of light from the laser 214 (illustrated in FIG. 2) to the readouts of the pixels 350 to achieve improved sensitivity and speed. For example, as provided herein, the imager control system 328 can control the microbolometer readout of each pixel 350 to be performed at a constant rate. In one, non-exclusive embodiment, the light sensing device 26 is controlled by the imager control system 328 so that the microbolometer readout of each pixel 350 occurs at a predetermined, target readout time interval, and that predetermined target readout time interval is similar to and based on the thermal time constant for heat to flow out of or into the absorbing region 352. Stated in another fashion, the light sensing device 26 can be controlled so that the microbolometer readout of each pixel 350 occurs at a substantially steady-periodic readout acquisition rate that is based on the thermal time constant for heat to flow out of or into the absorbing region 352.

More specifically, the target readout acquisition rate can be varied to suit the thermal time constant of the pixels 350 of the light sensing device 326. Stated in another fashion, the thermal time constant of each absorbing region 352 will depend on the design of each element 350. Thus, as provided herein, the target readout acquisition rate can be varied to suit the design of the elements 350. In one design, the thermal time constant is approximately ten milliseconds, and the target readout acquisition rate is thirty Hertz. In other, non-exclusive pixel designs, the predetermined target readout acquisition rate can be controlled by the imager control system 328 to be approximately 1, 10, 20, 25, 35, 40, 50, 60, 100 or 120 Hz.

In certain embodiments, the readout acquisition rate is substantially steady-periodic if it is within 0.4 percent of the target readout acquisition rate. For the example provided above, the readout acquisition rate is substantially steady-periodic if it is within 0.4 percent of thirty Hertz. Alternatively, the readout acquisition rate can be considered substantially steady-periodic if it is within 0.2 percent of the target readout acquisition rate.

As provided above, it is desirable to tie the readout of the light sensing device 326 to the tuning of the illuminating laser source 14 (illustrated in FIG. 1). In general, it is difficult to generate wavelengths of light with the laser source 14 at precisely defined time intervals with a mechanical tuning system such as that commonly used with most tunable infrared lasers.

Consider now the effect of self-cooling of the absorbing region 352 during readout on the proposed scheme of laser-based triggering. Implicit in the laser triggering scheme is that the time between frame acquisitions can be variable. To test how this affects the readout on the pixel array 348, experiments were performed.

Figure 4:
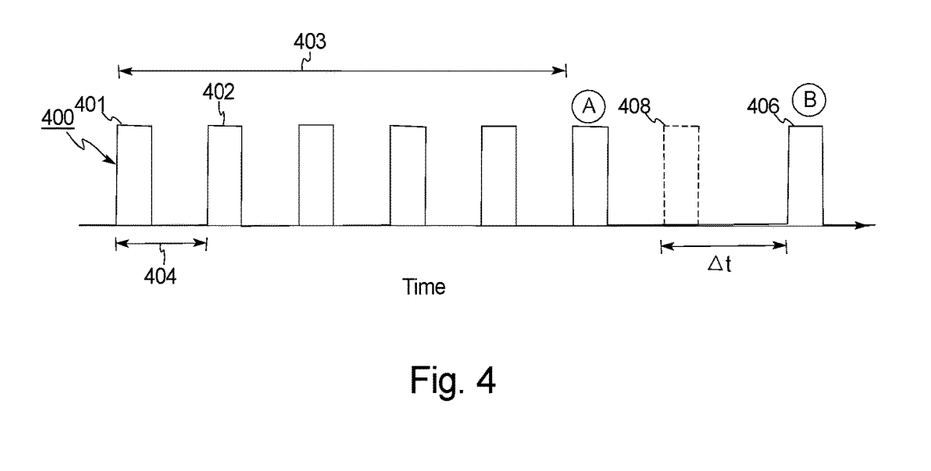
FIG. 4 is a graph that illustrates a steady stream of frame acquisitions by the light sensing device.

FIG. 4 is a graph 400 that illustrates a steady stream of readouts 401 ("frames") by the light sensing device 326 (Illustrated in FIG. 3A). In FIG. 4, each readout 401 is illustrated as square in the graph. Further, each readout 401 represents information collected from each of the individual pixels 350 of the light sensing device 326.

FIG. 4 illustrates that six steady periodic readouts 402 ("frames") are acquired at a steady-periodic, readout acquisition rate ("frequency") 403. These steady periodic readouts 402 are each separated by an equal readout time interval 404 (time between frame acquisitions). Subsequently, a non-steady-periodic, delayed, seventh readout 406 is taken after an additional time delay of delta t ("Δt") above the previous readout time interval 404. In FIG. 4, a skipped, seventh steady-state readout 408 is illustrated in phantom to show when in time it would have occurred if the steady state readouts would have been continued.

The readout acquisition rate 403 is the inverse of the readout time interval 404. So waiting for longer times between frames (readouts) leads to a lower frame acquisition rate. For example, (i) a readout acquisition rate 403 of thirty Hz will with a readout time interval 33 milliseconds, (ii) a readout acquisition rate 403 of thirty-three Hz will with a readout time interval 30 milliseconds, and (iii) a readout acquisition rate 403 of twenty-five Hz will with a readout time interval 40 milliseconds.

In the example illustrated in FIG. 4, enough of these readouts 402 are acquired at steady state until the difference in readouts 402 can be attributed to readout noise alone. The last readout 402 of the sequence (labeled A in FIG. 4) is then stored, and then the delayed readout 406 (labeled B in FIG. 4) is generated that has an additional time delay of Δt over the previous readout time interval 404. Subsequently, the readout at pulse A (where pixel 350 has had chance to come to equilibrium with constant readout time interval 404) is compared to delayed readout 406 at pulse B.

The difference in average FPA counts is then compared between the last steady-state readout 402 and the delayed readout 406. The result is shown in the graph in FIG. 5 which illustrates the difference in average pixel background as a function of overall delay between last pulse "A" in the 30 Hz sequence and the test pulse "B". Basically, FIG. 5 illustrates how the difference in FPA signal will change as the time delay between readout "A" and readout "B" changes from zero to eighty milliseconds.

Figure 5:
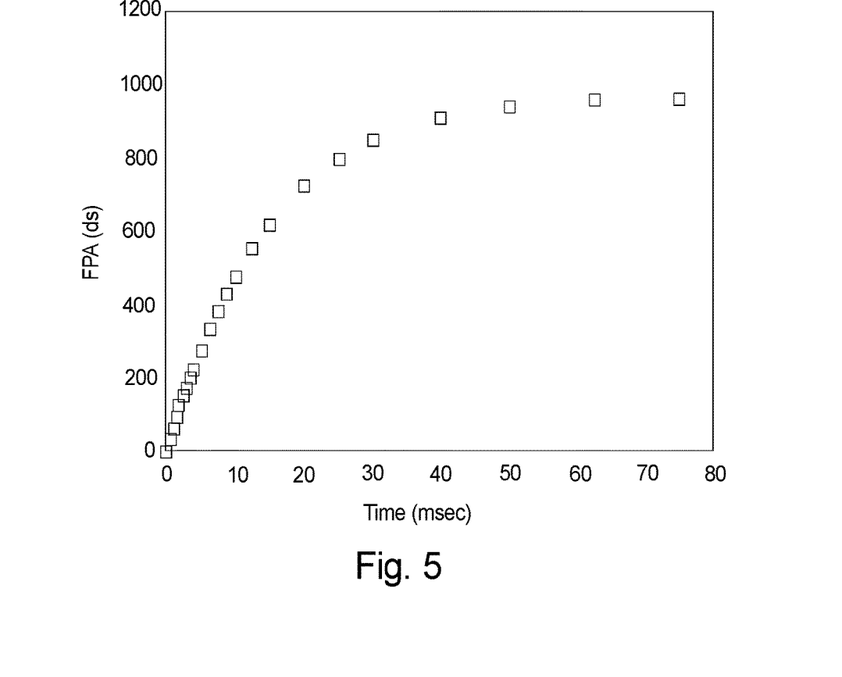
FIG. 5 is a graph that illustrates the difference in average pixel background signal as a function of additional delay time between last pulse "A" in a 30 Hz sequence and test pulse "B"

As be seen in FIG. 5, in this example, a relatively small time delay over the steady-state readout time interval of 30 Hz causes the average background readings to increase. This is because of the small amount of cooling associated with reading out the pixel 350 is being overcome by heat flowing back into the absorbing region 352 from the readout cell 354. In this example, the time constant of the pixel 350 is in the ten millisecond range. After about 40 milliseconds the effect starts to subside because the absorbing region 352 has had time to come to equilibrium with the readout cell 354. However, this regime is not of interest when trying to obtain the most rapid data acquisition from the camera. Frame rates drop by a factor of three or more. As provided above, the frame rate is the inverse of the time between frame acquisitions. So increasing the readout time interval between frames leads to a lower data acquisition rate.

It should be noted from FIG. 5 that a small amount of trigger delay variability about 30 Hz can cause significant shifts in overall background level. To ensure that these shifts do not alter the background level more than the underlying readout noise, it is necessary to keep trigger variability about the target readout acquisition rate of less than about 0.4%. This kind of low jitter would be difficult to attain with a mechanical tuning system, and such a constraint is equivalent to ensuring that the system arrives at the next wavelength in a time that varies less than a few parts per thousand for each wavelength step. Therefore, in certain designs, the method of triggering the acquisition by the light absorbing device 26 according to when the laser source 14 arrives at a wavelength has too much variability for practical systems to ensure that self-cooling does not affect the measurement.

As provided herein, in order to achieve maximum acquisition speed (in certain embodiments, acquisition rates need to be around 30 Hz to realize fastest acquisition) and minimal trigger variability (less than 0.4% about 30 Hz), the present invention triggers the acquisition rate of the light sensing device 26 to be fixed (e.g. camera triggering rate fixed at 30 Hz).

Stated in another fashion, in order to improve the acquisition rate, the imager control system 328 controls each pixel 350 to perform the readouts at a steady-periodic readout acquisition rate that varies less than 0.4 percent. In alternative, non-exclusive examples, the imager control system 328 can control each pixel 350 to have a steady-periodic, data acquisition rate that varies less than 0.05, 0.1. 0.2, 0.3, or 0.35 percent.

Figure 6:
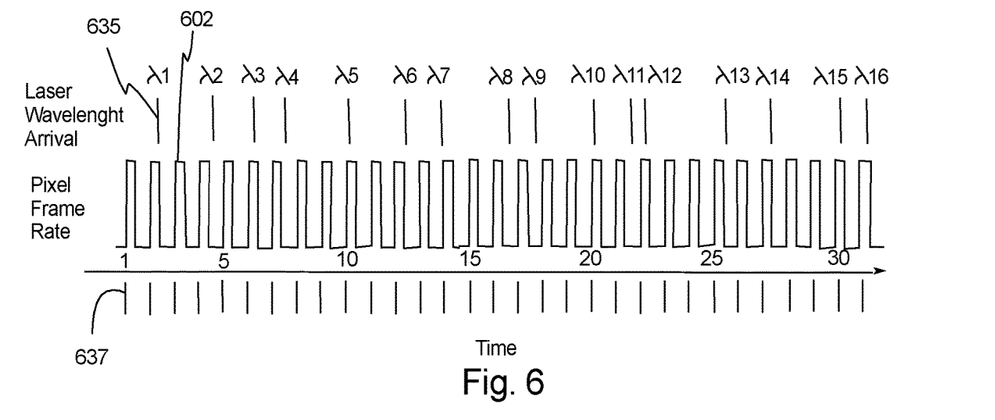
FIG. 6 is a graph that illustrates the triggering of the light sensing device and tagged wavelengths.

FIG. 6 illustrates one embodiment of the triggering of the light sensing device 326 (illustrated in FIG. 3A). In this embodiment, the light sensing device 326 is controlled by the imager control system 328 to take a series of readouts 602 of all of the pixels 350 at a steady-periodic readout acquisition rate while tuning the laser source 14 to realize the fastest, most efficient spectral imager acquisition. With this design, the light sensing device 326 captures the readouts 602 at the equally spaced apart readout time intervals. Stated in another fashion, the light sensing device 326 is controlled by the imager control system 328 to have a steady-periodic readout acquisition rate.

During this time, as illustrated in FIG. 6, the specific laser wavelength arrivals are tagged ("wavelength time stamped" 635, also referred to as "wavelength trigger timestamps") with the clock 28D (illustrated in FIG. 1) to the readouts 602 for later processing, while the trigger rate of the light sensing device 326 is held constant. Further, each of the readouts 602 is readout time stamped 637 by the clock 28D. As a result thereof, the readouts 602 can be matched up to the wavelengths of interest by the control system to generate the images 29 for the spectral cube 13.

This method is practical when the variation in laser tuning over a 30 Hz period is small compared to the width of the spectral features being measured. In the condensed phase, these widths are typically no narrower than about 8 $cm^{-1}$. If data frames are to be acquired every 0.5 $cm^{-1}$, then the uncertainty in wavelength is smaller than 0.5 $cm^{-1}$, which is not an issue for 8 $cm^{-1}$ wide features.

The frame tagging scheme relies on wavelength time-stamping 635 the arrival of the laser at a particular wavelength using the same hardware clock 28D that marks the arrival of each trigger of the readout 602 for the light sensing device 26.

In this embodiment, the present invention includes a spectral imager data acquisition system (e.g. an imaging microscope 12) that: (i) holds the triggering of the pixels 350 of the light sensing device 26 at constant maximum rate to ensure highest data rate and lowest frame-to-frame variability due to self-cooling on readout; (ii) uses a hardware clock 28D (illustrated in FIG. 1) to frame time stamp 637 (also referred to as "readout timestamp") the arrival of each frame trigger of the light sensing device 26; (iii) uses a tunable laser source 14 that generates a wavelength trigger signal pulse upon arrival of the laser pulse at specified wavelength intervals; (iv) uses the same hardware clock 28D to wavelength time-stamp the arrival of the laser pulse at each wavelength; (v) uses a data processing system (e.g. the control system 28) to match up each acquired frame with the associated laser wavelength arrival time stamp; and (vi) uses the control system 28 to construct a spectral cube based on this data acquisition scheme.

In certain embodiments, the control system 28 controls the laser source 14 to tune at the maximum possible rate to ensure that (i) there is no overlap of two or more laser wavelength trigger signals on the same frame of the light sensing device 26, and (ii) that the number of unused frames between laser wavelength signals is minimized as much as possible given the variability in laser tuning speed.

In certain embodiments, the present invention allows for the use of an inexpensive thermal camera in a rapid laser scanning spectral imager. This invention allows the maximum operating speed for a spectral imager with a thermal camera and tunable laser.

One commercial application for the present invention is for a mid-infrared imaging microscope based on a tunable quantum cascade laser and an uncooled $VO_x$ microbolometer array. The primary applications are tissue inspection, material inspection, and chemical identification.

It should be noted that FIG. 6 illustrates the plurality of readouts 602 (illustrated with a square pulse) captured by the light sensing device 326 versus time. The readouts 602 have been numbered for convenience. FIG. 6 illustrates the plurality of spaced apart wavelength time stamps 635 (tags) that each indicate when a separate set of sequential pulses having a wavelength of interest has begun in time. However, as provided above, each wavelength time tamp 635 can be at a different location in time, e.g. at the middle or end of each respective set of sequential pulses.

FIG. 6 illustrates a separate wavelength time stamp 635 for sixteen separate sets of pulses (pulses of each set with the same center wavelength) that were generated versus time with the laser source 14 (illustrated in FIG. 1). In this example, (i) a set of pulses at the first wavelength ($\lambda 1$) illuminates the sample while the second readout is being captured with the light sensing device 26; (ii) a set of pulses at the second wavelength ($\lambda 2$) illuminates the sample between the fourth and fifth readout being captured with the light sensing device 26; (iii) a set of pulses at the third wavelength ($\lambda 3$) illuminates the sample while the sixth readout is being captured with the light sensing device 26; (iv) a set of pulses at the fourth wavelength ($\lambda 4$) illuminates the sample between the seventh and eight readout being captured with the light sensing device 26; (v) a set of pulses at the fifth wavelength ($\lambda 5$) illuminates the sample while the tenth readout is being captured with the light sensing device 26; (vi) a set of pulses at the sixth wavelength ($\lambda 6$) illuminates the sample while the twelfth readout is being captured with the light sensing device 26; (vii) a set of pulses at the seventh wavelength ($\lambda 7$) illuminates the sample between the thirteenth and fourteenth readout being captured with the light sensing device 26; (viii) a set of pulses at the eighth wavelength ($\lambda 8$) illuminates the sample between the seventeenth and eighteenth readout being captured with the light sensing device 26; (ix) a set of pulses at the ninth wavelength ($\lambda 9$) illuminates the sample between the nineteenth and twentieth readout being captured with the light sensing device 26; (x) a set of pulses at the tenth wavelength ($\lambda 10$) illuminates the sample while the twenty-second readout is being captured with the light sensing device 26; (xi) a set of pulses at the eleventh wavelength ($\lambda 11$) illuminates the sample between the twenty-third and twenty-fourth readout being captured with the light sensing device 26; (xii) a set of pulses at the twelfth wavelength ($\lambda 12$) illuminates the sample while the twenty-fourth readout is being captured with the light sensing device 26; (xiii) a set of pulses at the thirteenth wavelength ($\lambda 13$) illuminates the sample between the twenty-seventh and twenty-eighth readout being captured with the light sensing device 26; (xiv) a set of pulses at the fourteenth wavelength ($\lambda 14$) illuminates the sample while the twenty-ninth readout is being captured with the light sensing device 26; (xv) a set of pulses at the fifteenth wavelength ($\lambda 15$) illuminates the sample while the thirty-second readout is being captured with the light sensing device 26; and (xvi) a set of pulses at the sixteenth wavelength ($\lambda 16$) illuminates the sample while the thirty-third readout is being captured with the light sensing device 26.

The control system 28 can use one or more readouts 602 around the wavelength time stamp 635 to generate the corresponding image for that wavelength. For example, in one non-exclusive example, the first, second and third readouts 602 can be averaged to generate the image that corresponds to the first wavelength. Somewhat similarly, the third, fourth, and fifth readouts 602 can be averaged to generate the image that corresponds to the second wavelength. Further, the fifth, sixth, and seventh readouts 602 can be averaged to generate the image that corresponds to the third wavelength. However, more or fewer readouts 602 can be used for each image. For example, the closest readout 602 to the wavelength time stamp 635 can be used for the analysis at that particular wavelength. Alternatively, the immediately previous readout 602 or the immediately subsequent readout 602 can be used for the analysis at that particular wavelength.

While the particular assembly as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An assembly for rapid thermal imaging data acquisition of a sample, the assembly comprising:
    a laser source that emits a laser beam that is directed at the sample, the laser beam including a plurality of pulses, with at least some of the pulses having a different center wavelength in the mid-infrared range;
    a light sensing device that senses mid-infrared light from the sample, the light sensing device including a pixel array; and
    a control system that includes a processor, the control system controlling the light sensing device to capture a plurality of sequential readouts from the pixel array with a steady periodic readout acquisition rate that varies less than 0.4 percent.

2. The assembly of claim 1 wherein the plurality of pulses include a plurality of alternative wavelengths of interest, and wherein the control system generates a different wavelength time stamp whenever the laser source emits a different wavelength of interest.

3. The assembly of claim 2 wherein the control system generates a readout time stamp for each readout of the pixel array.

4. The assembly of claim 3 wherein the control system constructs a spectral cube based on the readouts, the readout timestamps, and the wavelength trigger timestamps.

5. The assembly of claim 1 wherein the plurality of sequential readouts includes at least one hundred sequential readouts from the pixel array with a steady periodic readout acquisition rate.

6. The assembly of claim 1 wherein the steady periodic readout acquisition rate varies less than 0.2 percent.

7. The assembly of claim 1 wherein the steady periodic readout acquisition rate is within 0.4 percent of thirty Hertz.

8. The assembly of claim 1 wherein the control system constructs a spectral cube based on the readouts.

9. The assembly of claim 1 wherein the laser source includes (i) a gain medium adapted to generate a beam that exits the gain medium; (ii) a feedback device positioned in the path of the beam, the feedback device redirecting at least a portion of the beam back to the gain medium; (iii) a device mover that continuously adjusts an angle of incidence of the beam on the feedback device; and (iv) a position detector that generates a position signal that relates to the angle of incidence of the beam on the feedback device.

10. The assembly of claim 1 wherein the pixel array is a two dimensional array of pixels that is sensitive to mid-infrared light.

11. A method for rapidly acquiring data regarding a sample, the method comprising:
directing a laser beam at the sample with a laser source, the laser beam including a plurality of pulses, with at least some of the pulses having a different center wavelength in the mid-infrared range;
sensing mid-infrared light from the sample with a light sensing device that includes a pixel array; and
controlling the light sensing device to capture a plurality of sequential readouts from the pixel array with a steady period readout acquisition rate that varies less than 0.4 percent with a control system that includes a processor.

12. The method of claim 11 wherein the plurality of pulses include a plurality of alternative wavelengths of interest, and further comprising the step of generates a different wavelength time stamp whenever the laser source emits a different wavelength of interest with the control system.

13. The method of claim 12 further comprising generating a readout time stamp for each readout of the pixel array with the control system.

14. The method of claim 13 further comprising the step of constructing a spectral cube based on the readouts, the readout timestamps, and the wavelength trigger timestamps.

15. The method of claim 11 wherein the step of controlling includes the steady periodic readout acquisition rate varies less than 0.2 percent.

16. The method of claim 11 further comprising the step of constructing a spectral cube based on the readouts with the control system.

17. A mid-infrared microscope for generating a spectral cube of a sample, the mid-infrared microscope comprising:
a laser source that emits a laser beam that is directed at the sample, the laser beam including a plurality of pulses, with at least some of the pulses having a different wavelength of interest;
a light sensing device that senses mid-infrared light from the sample, the light sensing device including a two dimensional pixel array; and
a control system that includes a processor, the control system controlling the light sensing device to capture a plurality of sequential readouts from the pixel array with a steady periodic readout acquisition rate that varies less than 0.4 percent; the control system generating a different wavelength time stamp whenever the laser source emits a different wavelength of interest, and generating a readout time stamp for each readout of the pixel array; wherein the control system constructs a plurality of thermal images from that readouts and a spectral cube using the thermal images.

18. The mid-infrared microscope of claim 17 wherein the plurality of sequential readouts includes at least one hundred sequential readouts from the pixel array with a periodic state readout acquisition rate.

19. The assembly of claim 17 wherein the steady periodic readout acquisition rate varies less than 0.2 percent.

20. The assembly of claim 17 wherein the laser source includes (i) a gain medium adapted to generate a beam that exits the gain medium; (ii) a feedback device positioned in the path of the beam, the feedback device redirecting at least a portion of the beam back to the gain medium; (iii) a device mover that continuously adjusts an angle of incidence of the beam on the feedback device; and (iv) a position detector that generates a position signal that relates to the angle of incidence of the beam on the feedback device.

* * * * *